US006762987B2

(12) United States Patent
Langereis et al.

(10) Patent No.: US 6,762,987 B2
(45) Date of Patent: Jul. 13, 2004

(54) SLICER ARRANGEMENT

(75) Inventors: Gerardus Rudolph Langereis, Eindhoven (NL); Willem Marie Julia Marcel Coene, Eindhoven (NL); Constant Paul Marie Jozef Baggen, Eindhoven (NL); Johannus Leopoldus Bakx, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 309 days.

(21) Appl. No.: 09/753,742

(22) Filed: Jan. 2, 2001

(65) Prior Publication Data

US 2002/0085471 A1 Jul. 4, 2002

(51) Int. Cl.[7] ................................................ G11B 7/00
(52) U.S. Cl. .............................. 369/59.17; 369/124.15; 369/59.15
(58) Field of Search .......................... 369/32.01, 53.11, 369/53.22, 59.17, 59.18, 59.19, 59.22, 59.29, 124.15, 59.2, 59.24, 59.25

(56) References Cited

U.S. PATENT DOCUMENTS

| 4,835,759 A | * | 5/1989 | Saito et al. ............. 369/124.14 |
| 5,450,389 A | * | 9/1995 | Hayashi ................... 369/59.15 |
| 5,497,361 A | * | 3/1996 | Mita et al. ............. 369/124.15 |
| 6,324,135 B1 | * | 11/2001 | Kim et al. ............. 369/124.15 |

OTHER PUBLICATIONS

Langereis et al, "An Implementation of Limited Multi–Level (LML) Optical Recording", pp. 1–19 Sep. 2000.

* cited by examiner

*Primary Examiner*—Doris H. To
*Assistant Examiner*—Jorge L Ortiz-Criado
(74) *Attorney, Agent, or Firm*—Michael E. Belk (57) ABSTRACT

A circuit arrangement including means for determining a slicer level from incoming signal levels for slicing the incoming signal levels on the basis of the slicer level thus determined, includes a first and a second register circuit, which register circuits are connected to an output of a discriminator circuit. The discriminator circuit compares an incoming signal level with a set discrimination level and is adapted to apply an incoming signal level to the first register circuit if the incoming signal level is higher than the set discrimination level and to apply and incoming signal level to the second register circuit if the incoming signal level is lower than the set termination level. The first and the second register circuit are adapted to determine a register value of a least two different incoming signal levels consecutively applied to the register circuit. The circuit supplies a signal having a level which is a value determine from register values determined by the first and second register circuit. The supplied signal represents both the set discrimination level and the slicer level.

8 Claims, 7 Drawing Sheets

FIG. 11 ical manner.

SLICER ARRANGEMENT

The invention relates to a slicer arrangement including means for determining a slicer level from incoming signal levels and a slicer for slicing the incoming signal levels on the basis of the slicer level thus determined.

Such an arrangement is known from U.S. Pat. No. 5,450,389. The arrangement described therein converts signals from an optical signal reader into signals having well-defined "high" and "low" levels. For this purpose, the signals from the optical signal reader are sliced with respect to a slicer level by means of a slicer. The slicer level setting is determined from incoming signal levels, particularly in relation to the length of the relevant signal levels.

It is an object of the invention to provide such an arrangement in which the slicer level is determined exclusively by the incoming signal levels and in which the slicer level always is always centered with respect to a "high" level of the detected signals and a "low" level of the detected signals.

To this end, the arrangement in accordance with the invention is characterized in that the means for determining a slicer level include a first and a second register circuit, which register circuits are connected to an output of a discriminator circuit, which discriminator circuit compares an incoming signal level with a set discrimination level and is adapted to apply an incoming signal level to the first register circuit if the incoming signal level is higher than the set discrimination level and to apply an incoming signal level to the second register circuit if the incoming signal level is lower than the set discrimination level, which first and second register circuit are each adapted to determine a register mean value of at least two different incoming signal levels consecutively applied to the register circuit, and there is a mean-value circuit for supplying a signal having a level which is a mean value of the register mean values determined by the first and second register circuit, which supplied signal represents both the set discrimination level and the slicer level.

Thus, it is achieved that the slicer level is always centered with respect to the high level and the low level of the incoming signal levels applied to the arrangement. Moreover, it is achieved that no d.c. free code is required to guarantee that the slicer level is centered in the eyepattern. Moreover, it is achieved that the arrangement in accordance with the invention discriminates high signal levels from low signal levels on the basis of a provisional discrimination level and by selecting the slicer level so as to be centered with respect to the averaged high and low incoming signal levels. As a result, it is achieved that the arrangement can function correctly without the probability of a high level having to be equal to the probability of a low level, on condition that both levels occur.

A first preferred embodiment of an arrangement in accordance with the invention is characterized in that the first and the second comprise a shift register having a plurality of register positions for consecutively storing incoming signal levels applied by the discriminator circuit, and there is a register mean-value circuit for determining the arithmetic mean of the incoming signal levels stored in the register positions.

The arithmetic mean thus determined for the incoming signal levels stored in the register positions forms a progressive average. Since there is both a shift register for the higher incoming signal levels and a shift register for the lower incoming signal levels, the higher and lower levels being always determined with respect to the discrimination level, there is both an arithmetic mean of the higher signal levels stored in the first shift register and an arithmetic mean for the lower levels stored in the shift register of the second register circuit, which mean values are progressive averages, as a result of which the set discrimination level and the slicer level, as represented by the output signal of the mean-value circuit, are always centered with respect to the arithmetic mean values of the stored higher signal levels and the stored lower signal levels.

A further preferred embodiment of an arrangement in accordance with the invention is characterized in that each of the register circuits performs an operation upon the applied incoming signal levels, which operation is defined in that a new register mean value is determined by multiplying the current register mean value by a factor $(1-\alpha)$, where $0<\alpha<1$, and adding thereto a new incoming signal level to be added, which last-mentioned incoming signal level has been multiplied by a factor $\alpha$.

Thus, it is achieved that each register circuit requires only one register position, as a result of which the relevant circuit arrangement can be implemented in hardware form in an economical manner.

A further preferred embodiment of the arrangement in accordance with the invention is characterized in that the register mean value is defined by at least three different incoming signal levels applied consecutively to the register circuit, and the register mean value is the median of the incoming signal levels applied.

Thus, it is achieved that both the higher incoming signal levels and the lower incoming signal levels are filtered by a so-called median filter. Since use is made of the medium the register mean value will be even more reliable than in the preceding preferred embodiment because excessive higher incoming signal levels and excessive lower incoming signal levels are removed by the median filter and have no influence on the process of determining the register mean value.

A further preferred embodiment of an arrangement in accordance with the invention is characterized in that there is a timing circuit for at least one of the register circuits, the timing circuit has an output connected to a control input of the discriminator circuit, the timing circuit is adapted to be started each time that the discriminator circuit supplies an incoming signal level to the respective register circuit, and to supply upon expiry of a predetermined time interval a control signal to the output connected to the control input of the discriminator circuit, for controlling the discriminator circuit so as to transfer a next signal level to the respective register circuit without discrimination.

Thus, it is achieved that in the case of a temporary absence of lower and/or higher signal levels, such as in the case of flaws or fingermarks on an information carrier being read, the arrangement ensures that the correct discrimination level and the correct slicer level are re-centered with respect to higher incoming signal levels and lower incoming signal levels. The gist of it is that if one of the two signal levels has not or both signal levels have not appeared after a first time interval the discriminator circuit yet supplies a signal, in which case it does not make any difference for the operation of the arrangement whether the incoming signal level thus supplied is a low or a high incoming signal level and is supplied to the register circuit for high or low incoming signal levels, respectively. The discriminator circuit in fact no longer discriminates.

Particularly the arrangement in which each of the register circuits performs an operation upon applied incoming signal levels, which operation is defined in that a new register mean value is determined by multiplying the current register mean value by a factor $(1-\alpha)$, where $0<\alpha<1$, and adding thereto a new incoming signal level to be added, which level has been multiplied by a factor $\alpha$, makes it possible to discriminate between scratches and fingermarks on the information carrier with the aid of the timing circuit. By a suitable choice of the factor $\alpha$ and the duration of the predetermined time interval it is possible to maintain the register mean value and, consequently, the discrimination level and the slicer level during a scratch of short duration, while during a fingermark, which is generally of a longer duration than a scratch, the arrangement will search for the correct discrimination level and the slicer level after expiry of the predetermined time interval. A further advantage of this embodiment is that during the search for the correct level after expiry of the predetermined time interval "detected" bits may be marked as "not present" for the purpose of error corrections.

The invention will now be described in more detail with reference to the accompanying drawings, in which.

Figure 1:
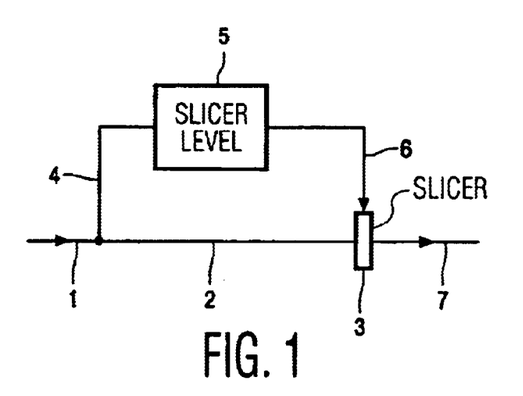
FIG. 1 is a diagrammatic representation of the circuit arrangement in accordance with the invention.

FIG. 1 shows a line 1 with incoming signal levels, which line divides into a line 2 to a slicer 3 and a line 4 to a circuit arrangement 5 for determining a slicer level from incoming signal levels. The slicer level determined by the circuit 5 is applied to the slicer 3 via the line 6. The incoming signal levels on the line 2 are converted into "high" and "low" signal levels on a line 7 by comparison with the slicer level 6.

Figure 2:
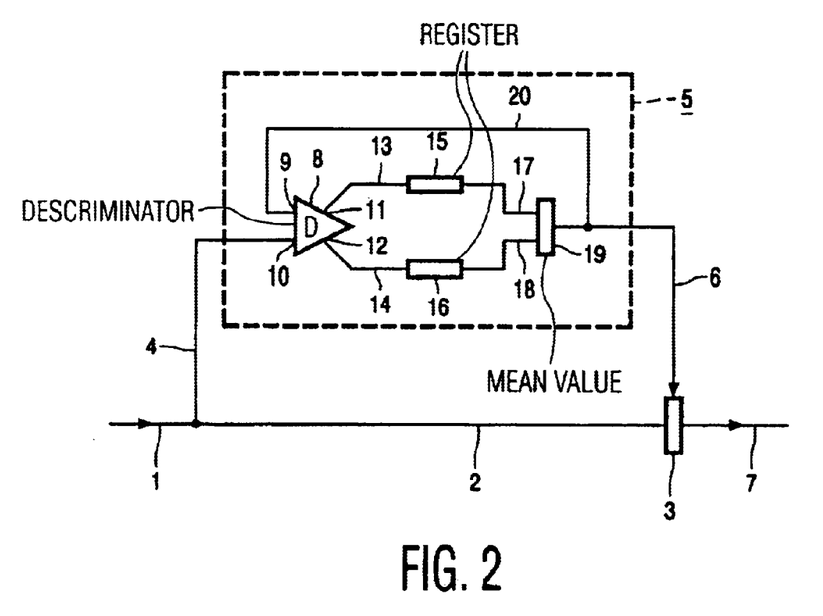
FIG. 2 is a more detailed diagrammatic representation of a circuit arrangement in accordance with the invention.

FIG. 2 diagrammatically shows the circuit arrangement 5. The circuit arrangement 5 includes a discriminator circuit 8 having a first input 9 and a second input 10 and having a first output 11 and a second output 12. The discriminator circuit 8 has its output 11 connected to an input of a first register circuit 15 via a line 13. The discriminator circuit 8 has its output 12 connected to an input of a second register circuit 16 via a line 14. The first register circuit 15 has an output connected to a first input of a mean-value circuit 19 via a line 17 and the second register circuit 16 has an output connected to a second input of the mean-value circuit 19 via a line 18. The mean-value circuit 19 has an output connected both to the first input 9 of the discriminator circuit 8 via a line 20 and to a slicer level input of the slicer 3 via the line 6. Clock signals and devices for the generation of such signals for the circuit arrangement in FIG. 2 are not shown for the sake of clarity and will not be described any further because the control of digital circuits by means of clock signals is generally known.

The operation of the circuit arrangement shown in FIG. 2 may be described as follows. Initially, when no signals having different incoming signal levels are received via the line 1, the slicer level on the line 6 as well as the signal level on the line 1 will be zero. Subsequently, signals having different signal levels are received via the line 1. For the time being, each incoming signal level will be classified as "high" because each incoming signal level received on the input 10 of the discriminator circuit 8 via the line 4 is compared with the zero level present on the line 20 and on the input 9 of the discriminator circuit 8. As a result, each incoming signal level received via the line 4 is higher than the discrimination level on the line 20. All the incoming signal levels, both "high" and "low", are first applied to the register circuit 15 via the output 11 and the line 13. The register circuit 16 remains loaded with a "zero level". Subsequently, the register mean value of all signal levels received by the circuit arrangement 5 via the line 4 and the mean value of "zero level", which is still zero, become available on the lines 17 and 18, respectively. Consequently, the level on the line 17 will rise gradually. As a result of this, the output level of the mean-value circuit 19 will also rise. The output level of the mean-value circuit 19 is applied to the line 9 of the discriminator circuit 8 via the line 20. As a result of the slow rise of the level on the input 9 of the discriminator circuit 8 incoming signal levels will appear on the line 4, which are received by the discriminator circuit 8 via the input 10, and because these incoming signal levels are lower than the slowly risen level on the input 9 of the discriminator circuit 8 they will be applied to the output 12 of the discriminator circuit 8 and to the register circuit 16 via the line 14. The register circuit 16 will now gradually generate an output signal on the line 18, which output signal differs from the "zero level", assuming that the low level of the incoming signal levels differs from zero. After some time, which depends on the number of incoming signal levels received per unit of time via the line 1 and on the time required by the register circuits 15 and 16 to reach a "stable" final state, the output level of the mean-value circuit 19 will be equal to the mean of the levels present on the lines 17 and 18 and will therefore, by definition, be centered between the signal levels applied to the register circuit 15 by the discriminator circuit 8 and the signal levels applied to the register circuit 16 by the discriminator circuit 8. Provided that the incoming signal levels on the line 1 do not overlap one another, the result is that the level on the output of the mean-value circuit 19 is always centered between the high incoming signal levels and the low incoming signal levels on the line 1. Consequently, the slicer level on the line 6 will always be centered between the high incoming signal levels on the line 6 and the low incoming signal levels on the line 2. As a result of this, the slicer 3 will always compare any incoming signal level on the line 2 with a slicer level on the line 6 centered between the high incoming signal levels and the low incoming signal levels on the line 2.

Figure 3:
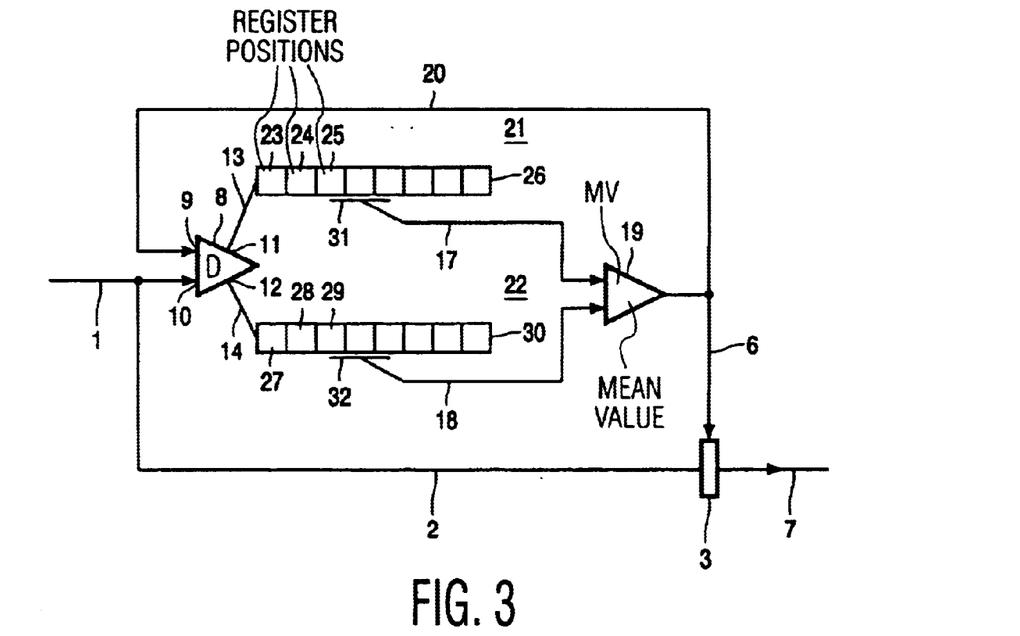
FIG. 3 is a diagrammatic representation of a circuit arrangement forming a first embodiment of the invention.

FIG. 3 shows in more detail register circuits 21 and 22, which correspond to the register circuits 15 and 16 in FIG. 2. The register circuit 21 comprises a shift register having register positions 23, 24, 25, . . . 26 and a circuit which is represented diagrammatically by the reference numeral 31 which is capable of producing on the line 17 an output signal whose level is the mean value of the levels consecutively stored in the register positions 23, 24, 25, . . . 26. Each time that an incoming signal level is loaded into the register position 23 the content of this register position 23 is transferred to the register position 24 and the content of the register position 24 is transferred to the register position 25 etc. and finally the content of the register position 26 is removed and replaced with the content of the register position which precedes the register position 26. Thus, the level on the line 17 forms a progressive mean of the "high" signal levels supplied to the register circuit 21 by the discriminator circuit 8 via the output 11 and the line 13. The register circuit 22 is comparable to the register circuit 16 shown in FIG. 2. The register circuit 22 comprises register positions 27, 28, 29, . . . 30 and a circuit 32, which is shown diagrammatically, for the calculation of a mean value of the contents of the register positions 27, 28, 29, . . . 30. An output level of the circuit 32 appears on the line 18. In the same way as described hereinbefore for the register circuit 21, the level on the line 18 in the case of the register circuit 22 is the mean value of the "low" signal levels supplied to the register circuit 22 by the discriminator circuit 8 via the output 12 and the line 14. Consequently, a progressive mean of the relevant "low" signal levels is available on the line 18. As described hereinbefore with reference to FIG. 2, the mean value of the levels available on the lines 17 and 18 is obtained on the lines 26 by means of the mean-value circuit 19.

Figure 4:
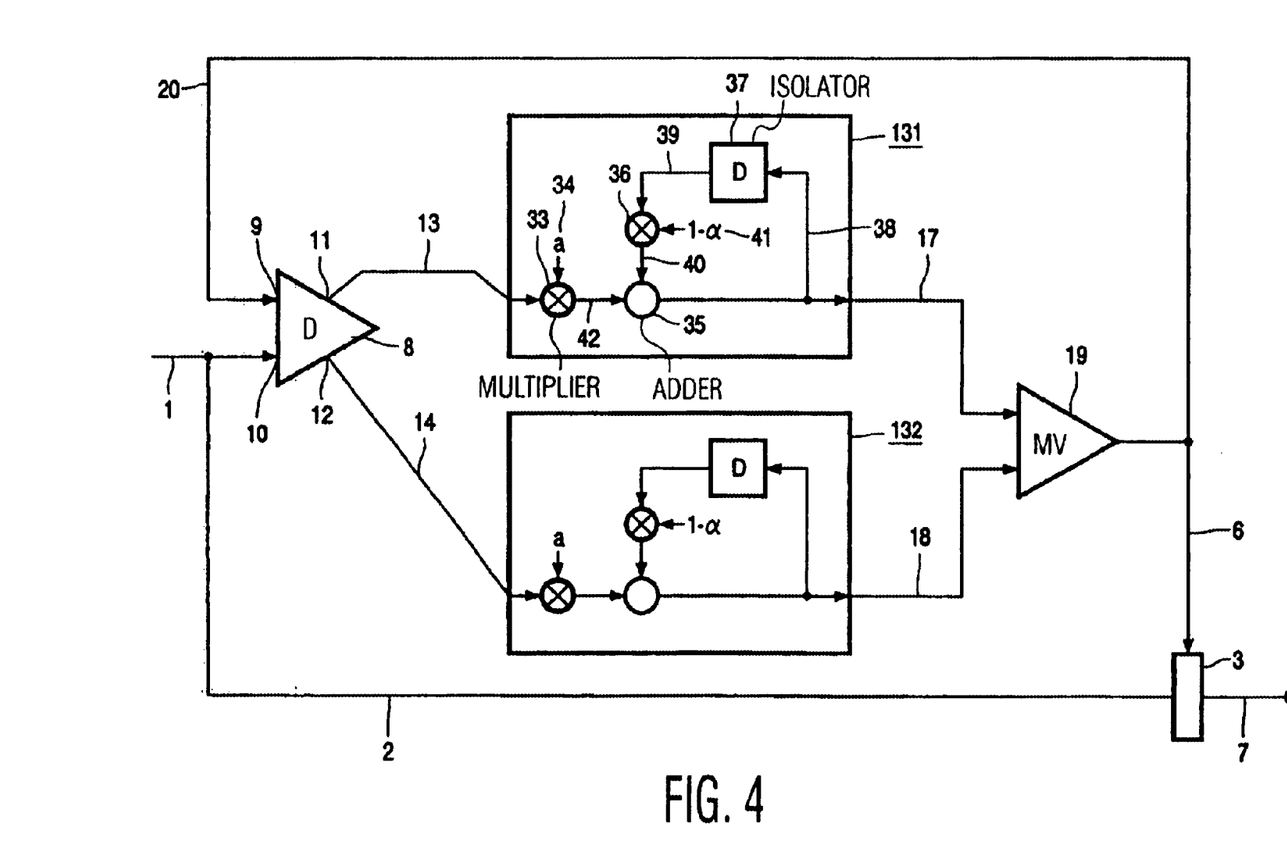
FIG. 4 is a diagrammatic representation of a circuit arrangement forming a second embodiment of the invention.

FIG. 4 shows the circuit arrangement in accordance with the invention and another embodiment. The circuits 131 and 132 shown in FIG. 4 correspond to the register circuits 15 and 16, respectively in FIG. 2. As the circuits 131 and 132 are identical only the circuit 131 will be described more detail. In the circuit 131 the line 13 is connected to a first input of a multiplier circuit 33, which has a second input arranged to receive a multiplying factor α, having the reference normal 34, smaller than 1. The multiplier circuit 33 has an output connected to an input of an adder circuit 35. The adder circuit 35 has a second input connected to an input of the multiplier circuit 36. The multiplier circuit 36 is adapted to multiplied and output stage on a line 39 opened isolating circuit to 37 by a factor (1−α), having the reference numeral 41. The isolating circuit 37 has an output connected to the line 17 via a line 38.

The circuit 131 operates as follows. It is assumed, without detraction from generality, that the line 17 carries a level A. Via the line 38 and the isolating circuit 37 the level A also appears on the line 39 and on the input of the multiplier circuit 36. The other input of the circuit 36 carries a signal of a magnitude 1−α, as a result of which the output signal on an output 40 of the multiplier circuit 36 will be (1−α). A. Subsequently, the discriminator circuit 8 supplies a signal level S to the multiplier circuit 33 via the line 13. The multiplier circuit 33 is clocked in known manner to multiply the signal level S by the factor α and to make the multiplied signal α.S available on its output and on the input of the adder circuit 35. Subsequently, the signal (1−α). A appearing on the line 40 and the signal α.S appearing on the line 42 are added to one another by the adder circuit 35, the result of the addition being applied to the line 17. In this way, the level on the line 17 is continually adapted to the incoming signal level on the line 13. In the same way, the level on the line 18 is continually adapted to "low" incoming signal levels on the line 1 and on the line 14, respectively, with the aid of the circuit 32. As already described with reference to FIG. 2 and as will also be evident in this case, the level on the line 17 is determined exclusively by "high" incoming signal levels and the level on the line 18 is determined exclusively by the "low" incoming signal levels on the line 1. Since the level on the line 17 is determined exclusively by "high" incoming signal levels on the line 1 and the level on the line 18 is determined by the "low" incoming signal levels on the line 1, the output signal of the mean-value circuit 19 will be centered between the "high" incoming signal levels and the "low" incoming signal levels on the line 1. It is again assumed that there is no overlap between the "high" and the "low" incoming signal levels on the line 1. Nevertheless, it will be evident, also see the description with reference to FIGS. 6 and 7, that even in the case of an overlap between the "high" and the "low" incoming signal levels on the line 1 the output level of the mean-value circuit 9 will be situated between the signal level corresponding to a peak in the graph representing "high" incoming signal levels and the signal level corresponding to the peak in the graph representing the "low" incoming signal levels on the line 1. However, for those signal levels received on the line 1 which belong, respectively, to the "low" and the "high" incoming signal level and which are, respectively, greater and smaller than the discrimination level on the line 20 and the slicer level on the line 6, a "high" signal level and a "low" signal level, respectively, will appear on the line 7, whereas this should have been "low" and "high", respectively. If the overlap occurs in this sense, i.e. respectively rising above and dropping below the discrimination level and the slicer level, the erroneous bits can be detected and corrected by a correction circuit.

Figure 5:
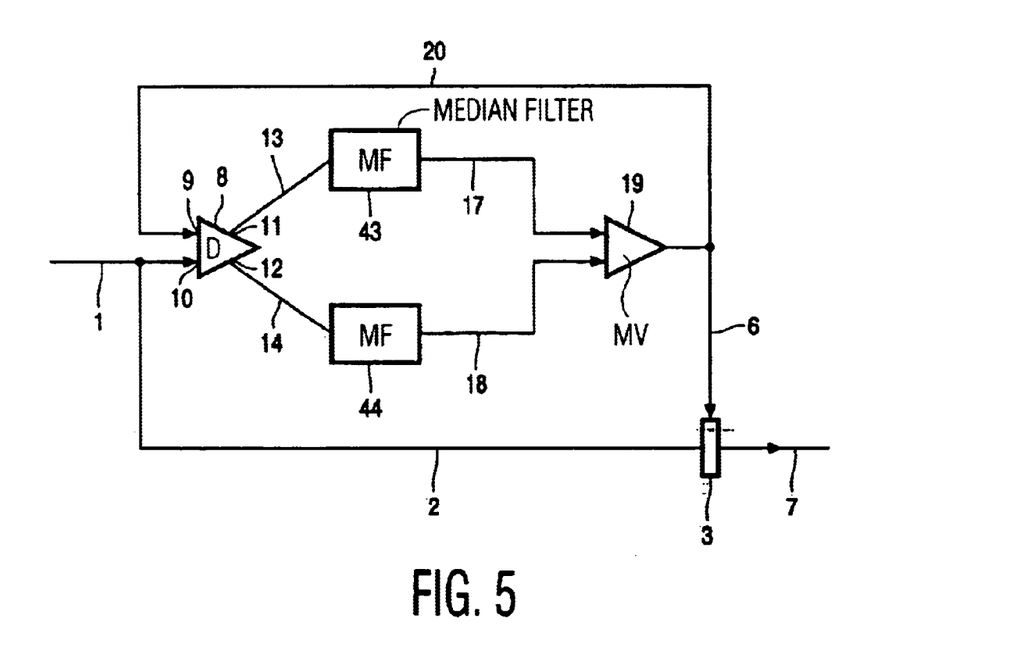
FIG. 5 is a diagrammatic representation of a circuit arrangement forming a third embodiment of the invention.

FIG. 5 shows a circuit arrangement in accordance with the invention in which the register circuits 15 and 16 are formed by a median filter 43 and median filter 44, respectively. The median filters 43 and 44 are adapted to store and transfer a plurality of "high" incoming signal levels and "low" incoming signal levels applied via the lines 13 and 14, respectively, in a manner comparable to the shift registers 21 and 22 shown in FIG. 3. The median filters 43 and 44 are adapted to detect at any instant which is signal level is stored most frequently. Subsequently, the relevant signal value is applied to the respective line 17 or 18. An advantage of the median filters 43 and 44 is that any random peaks in signal value, both in an upward and a downward sense with respect to the most frequently occurring value, have no influence on the levels of the line 17 and 18, which renders the operation of circuit, i.e. the setting of the levels on the lines 20 and 6, stabler than the settings of the levels on the lines 20 and 6 in the circuit arrangement a shown in FIGS. 3 and 4.

Figure 6:
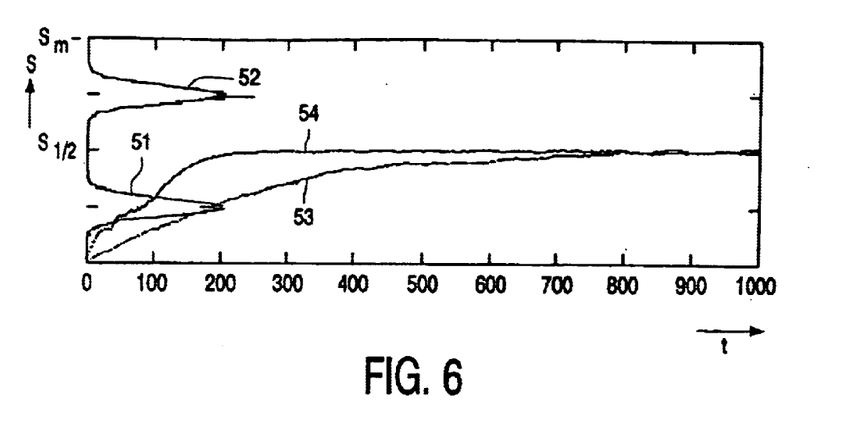
FIG. 6 illustrates the operation of a circuit arrangement in accordance with the invention and of a prior-art circuit arrangement in the case of an equally frequent occurrence of high and low signal levels.

By way of example, FIG. 6 illustrates the operation as a function of time for a circuit arrangement as shown in FIG. 4 in comparison with the operation of a prior-art circuit arrangement. The left-hand side of FIG. 6 shows the distribution of the incoming signal levels in numbers, plotted to the right, as a function of the signal magnitude plotted in a vertical direction. There is a peak 51 of "low" incoming signal levels, which peaks around a signal level of a quarter of a maximum signal level Sm. Likewise, a second peak 52 of "high" incoming signal levels is shown, which peaks around a signal level which is approximately three quarters of the maximum possible signal level and which also exhibits a spread around this level. On an average, the "low" and the "high" incoming signal levels appear equally frequently, which is apparent from the equal heights of the peaks 51 and 52. The conventional circuit arrangement starts with a slicer level of zero and increases, in accordance with a curve 53 (in this part of FIGS. 6 and 7 the time is plotted horizontally in arbitrary units), to a signal level S½ centered between the peak values of the peaks 51 and 52. The conventional slicer has a bandwidth of 3 kHz at one×SD speed, clock rate 4.43 MHz. A curve 54 represents the result of the use of a circuit arrangement as shown in FIG. 4, where $\alpha=0.05$. It is evident that the circuit arrangement in accordance with the invention is capable of more rapidly producing correct output signals on the line 7 than the prior-art circuit arrangement.

Figure 7:
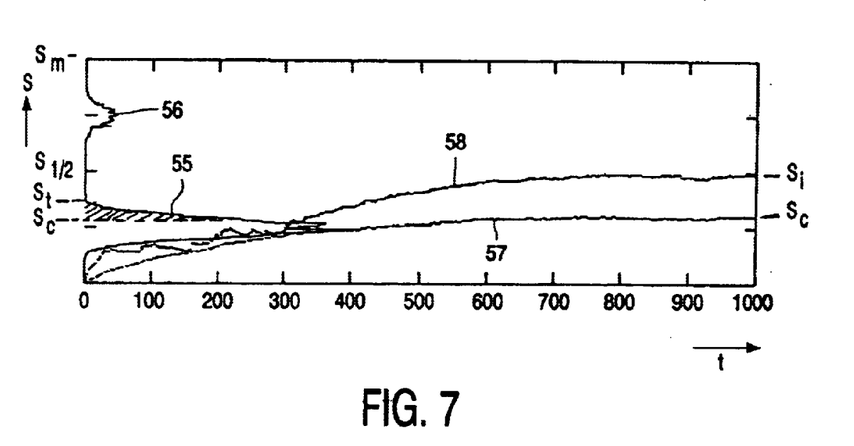
FIG. 7, in the same way as FIG. 6, illustrates the situation in the case that low levels occur 10 times as frequently as high levels.

FIG. 7 illustrates a comparable situation but in this case the probability of a "high" incoming signal level is ten times as small as the probability of a "low" incoming signal level. In FIG. 7 this is apparent from the fact that the peak height of a peak 56 of the "high" incoming signal levels is ten times as small as the peak height of the peak 55 of "low" incoming signal levels. It is found that a conventional circuit arrangement, owing to the far more frequent occurrence of "low" incoming signal levels, will finally reach a level Se which substantially coincides with the top level of the peak 55 and as represented by a curve 57. A curve 58 shows the output level of the mean-value circuit 19 on the lines 20 and 6 of a circuit arrangement as shown in FIG. 4 as a function of time. As described with reference to FIG. 4, the signal levels on the lines 17 and 18 are independent of the number of times that a "low" incoming signal level or a "high" incoming signal level appears on the line 1. This is also apparent from FIG. 7, where the curve 58 finally reaches a signal level Si which lies at a signal level S½, i.e. exactly centered between the tops of the peaks 55 and 56. It is to be noted that in the curve 57 a number of "low" incoming signal levels, namely the signal levels situated between Sc and St will erroneously be interpreted as a "high" incoming signal level and will therefore appear on the line 7 with an incorrect level.

Figure 8:
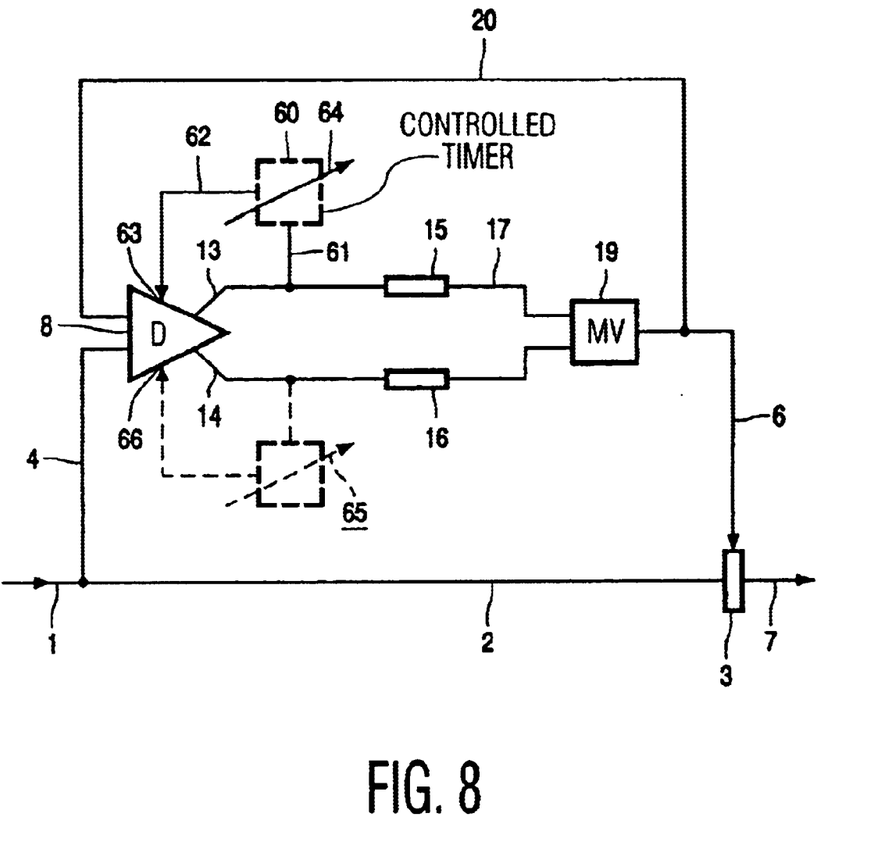
FIG. 8 is a diagrammatic representation of a circuit arrangement forming a fourth embodiment of the invention.

Circuit arrangements of the type to which the invention relates are frequently used for reading optical signal carriers such as CDs, CD-ROMs, DVDs etc. Such signal carriers may become damaged as a result of which a number of bits are no longer readable, or fingermarks may be formed on said carriers, as a result of which the maximum signal magnitude collapses. FIG. 8 shows how in a circuit arrangement in accordance with the invention measures can be taken to preclude the effects of the presence of flaws (also referred to as "erasures") and fingermarks and, if desired, to distinguish between them. A timing circuit 60, which may be adjustable by means of a control 64, has an input connected to the line 13 via a line 61 and has an output connected to a control input 63 of the discriminator circuit 8 via a line 62. The timing circuit 60 is adapted to be started each time that a signal level is supplied to the register circuit 15 by the discriminator circuit 8 via the line 13. The timing circuit 60 is further adapted to supply a signal each time that, upon expiry of a predetermined time interval after starting, which time interval may have been set by means of the control 64, without a restart having been performed in response to a signal on the line 61. The discriminator circuit 8 is adapted, in response to the signal from the timing circuit appearing on the line 62 and applied via the control input 63, to apply the next incoming signal level on the line 4 to the register circuit 15 via the line 13. It is then irrelevant whether the respective incoming signal level is a "high" or a "low" incoming signal level.

In the case of an erasure or a fingermark it is possible that for some time there are no "high" incoming signal levels on the line 1 higher than the discrimination level present on the line 20. As a result of this, no incoming signal levels are applied to the register circuit 15 by the discriminator circuit 8. Moreover, the level on the line 17 will not change as a result of this. Owing to the erasure or fingermark both the "high" and the "low" incoming signal levels on the line 1 will be smaller than the level on the line 20 and on the line 6. As a result of this, the slicer 3 will generate only a low level on the line 7 during this period. The register circuit 15 no longer receives any new incoming signal levels and constantly presents the same level to the mean-value circuit 19 via the line 17. If no measures were taken, such as the provision of the timing circuit 60, the levels on the lines 20 and 6 could not be adapted to the situation in which an erasure or a fingermark is present on the optical information carrier. The timing circuit 60, in conjunction with the control signal on the line 62 and the discriminator circuit 8, which in response to a control signal on the line 62 and the control input 63 supplies any signal level to the register circuit 15 via the line 13, ensures that in the case of an erasure or fingermark the register circuit 15 is supplied with incoming signal levels, both "high" and "low", which are smaller than the incoming signal levels present in the register circuit 15 before the erasure or fingermark took effect. The timing circuit 60 has the effect that, as a result of the application of arbitrary but in any case lower signal levels to the register circuit 15, the level on the line 17 is lowered systematically, by one step each time that the time interval of the timing circuit 60 expires without a restart. This process continues until the level on the output of the mean-value circuit 19 has become so low that again incoming signal levels are present on the lines 1 and 4 which are higher than the level on the lines 20 and 6.

By means of a reference numeral and in broken lines FIG. 8 shows that as an alternative to or in addition to the timing circuit 60 a timing circuit 65 may be arranged between the line 14 and a corresponding control input 66 of the discriminator circuit 8. It may be regarded as an advantage of the provision of the timing circuit 60 and/or the timing circuit 65 that in the case of a fingermark, owing to its size, so many bits are involved that it is desirable to adapt the discrimination level and the slicer level to the situation that both the "high" and the "low" incoming signal level have decreased in magnitude as a result of the fingermark. Conversely, it is generally desirable to maintain the slicer level in the case of a scratch or other flaw which is generally of a short duration than a fingermark and involves less bits. By an appropriate choice of the time interval of the timing circuit 60 a distinction can be made between scratches, on the one hand, and fingermarks, on the other hand. This will be explained with reference to FIG. 9 for fingermarks and FIG. 10 for scratches.

Figure 9:
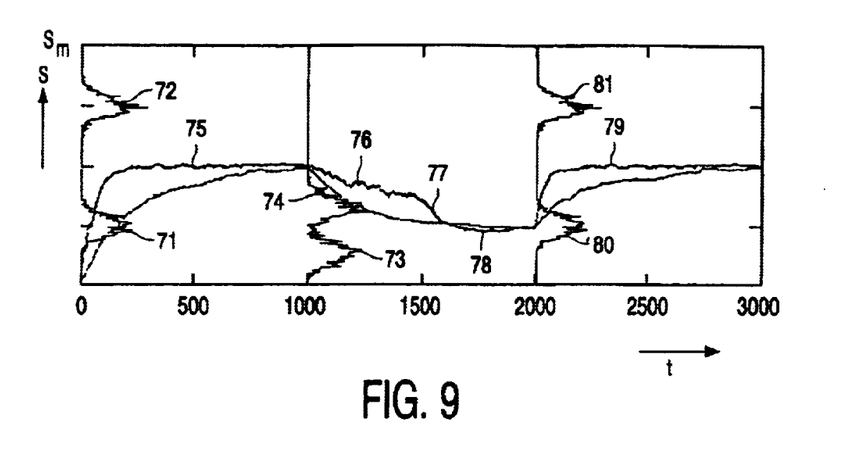
FIG. 9 illustrates the operation of a circuit arrangement in accordance with the invention and of a prior-art circuit arrangement when a fingermark occurs.
Figure 10:
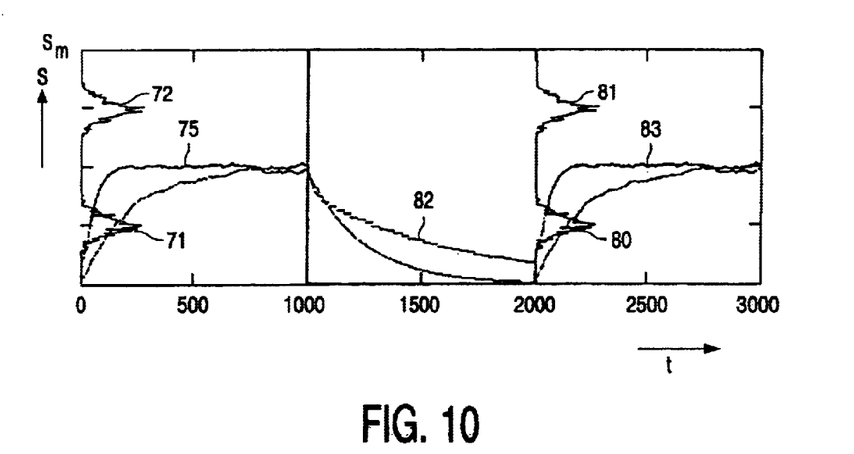
FIG. 10 illustrates the operation of a circuit arrangement in accordance with the invention and of a prior-art circuit arrangement when a scratch occurs.

In FIG. 9 signal peaks 71 and 72 having signal magnitudes of approximately 0.25 and 0.75 Sm between the instants 0 and 1000. Between the instants 1000 and 2000 a fingermark is present, as a result of which the peak of the "low" incoming signal levels will be situated at approximately 0.15 Sm and the peak 74 of the "high" incoming signal levels will be situated at approximately 0.30 Sm. Consequently, both the "low" and the "high" signal levels will be situated below the discrimination level and the slicer level as represented by the curve 75.

Since the register circuit 16 is refreshed with even lower incoming signal levels of the peak 73 the discrimination level on the line 20 and the slicer level on the line 6, as represented by the curve 76, decrease slightly with respect to the curve 75.

The timing circuit 60 is set to a given value. In this respect it is to be noted that the time plotted along the horizontal axis in FIGS. 6, 7, 9 and 10 is expressed in arbitrary units and the expiry times of the timing circuits 60 and 65 are also expressed in arbitrary units. The timing circuit 60 is active from the instant 1500. The result of this is that the level on the output of the mean-value circuit 19 gradually decreases in accordance with the invention the curve 76 until at the instant 1500 again "high" incoming signal levels in excess of the discrimination level and the slicer level are applied to the register circuit 15 by the discriminator circuit 8 without the intervention of the timing circuit 60. In a manner which is known per se, in view of the above, the discrimination level and the slicer level rapidly go rapidly to the center of the peaks 73 and 74 via a curve 77, as is represented by a curve 78. Subsequently, the curve 78, which is centered between the peaks 73 and 74, remains effective until the fingermark has ended at the instant 2000. From the instant 2000 a curve 79 rises rapidly to the center between the peaks 80 and 81, which correspond to the peaks 71 and 72. The electronic circuitry to which the signal on the line 7 is applied may include electronic error correction circuits, which on the basis of the time during which the timing circuit 60 has been active will interpret the signal levels present on the line 7 in the relevant period as erroneous.

FIG. 10 again shows the peaks 71 and 72 and the variation of the level on the output of the mean-value circuit 19, which bears the reference numeral 75. Between the instants 1000 and 2000 there is a flaw on the optical information carrier, as a result of which no signal at all, neither a "high" nor a "low" incoming signal level, will reach the discriminator circuit 8 and, consequently, the register circuits 15 and 16. The absence of all incoming signal levels is indicated by means of the vertical straight line at the instant 1000 in FIG. 10. A curve 82 represents the active state of the timing circuit 60. The level on the output of the mean-value circuit 19 drops to zero, at first rapidly and then slowly. Before the zero level is reached at the instant t=2000 the flaw has ceased and the peaks 80 and 81 appear again, the level on the output of the mean-value circuit 19 again rising rapidly, in accordance with the curve 83, to the center between the peaks 80 and 81.

Figure 11:
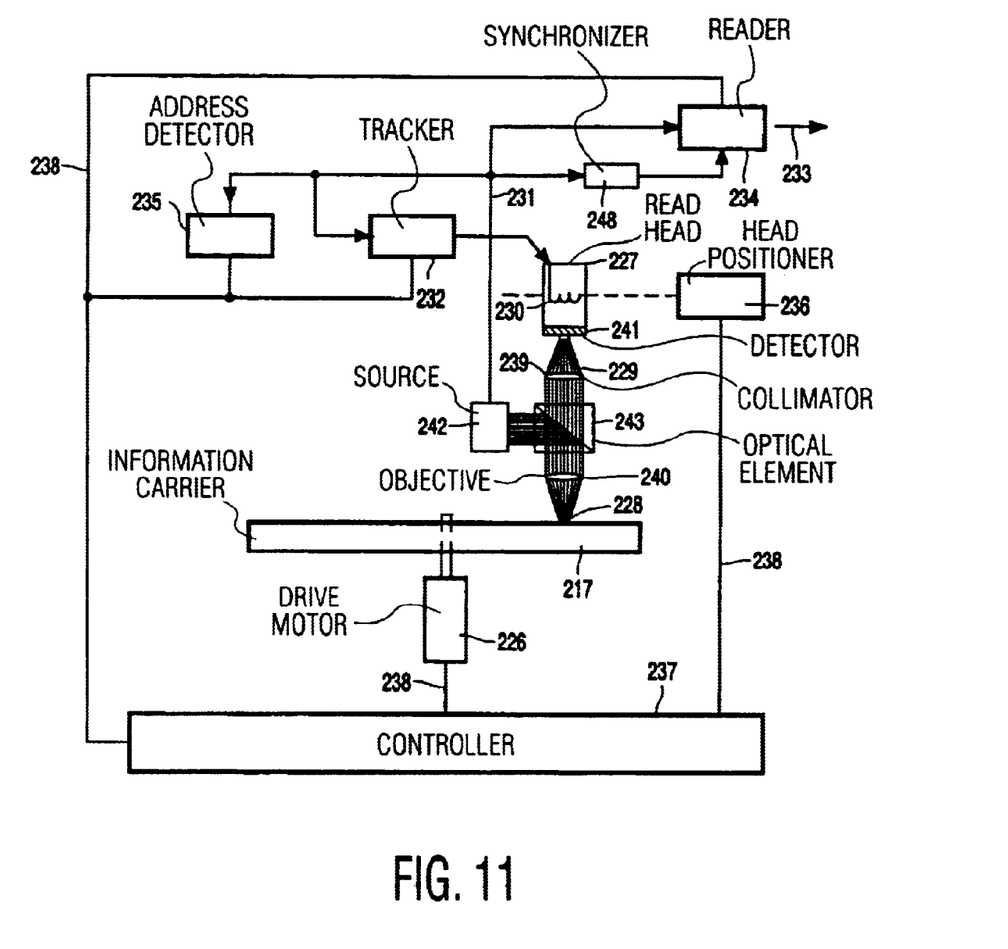
FIG. 11 shows diagrammatically an apparatus for reading an information carrier.

FIG. 11 shows an apparatus in accordance with the invention for reading the information carrier 217. The apparatus includes drive means 226 for rotating the information carrier 217 and a read head 227 for reading the tracks provided on the information carrier. The read head 227 has an optical system of a known type, for focusing a light spot 228 onto a track by means of a light beam 229 guided by optical elements, such as a collimator lens 239, for collimating the light beam, and an objective lens 240, for focusing the light beam. The light beam 229 is obtained from a radiation source 24, for example an infrared laser diode having a wavelength of 650 mm and an optical output of 1 mW. The read head 227 further includes a track follower for the fine positioning of the light spot 228 in a radial direction on the center of the track. The position of the light spot can also be adapted to the position of the track by changing the position of the objective lens.

After having been reflected from the information carrier 217 the light beam 229 is imaged onto a detector 242 of a known type, for example a quadrant detector, by means of a further optical element 243. The detector 242 generates detector signals 231, which signals include a read signal, a tracking error signal, a focus error signal, a synchronizing signal and a lock-in signal. The further optical element 243 is, for example, a beam splitter cube 243, a polarizing beam splitter cube, a pellicle or a retarder. The apparatus further includes tracking means 232 connected to the read head 227 to receive the tracking error signal from the read head 227 and to control the tracking actuator 230. During reading of the information carrier 217 the read signal is converted to output information 233 in the read means 234. The read means include a slicer arrangement in accordance with the invention and a channel decoder and/or an error corrector. The apparatus further includes an address detector 235, for recovering the addresses from the detector signals 231, and positioning means 236, for the coarse positioning of the read head 227 in the radial direction of the track. The apparatus further includes detection means 248 for receiving the detector signals 231 from the read head 227. The detection means 248 use the detector signals 231 for the synchronization of the read means 234. The apparatus further includes a system control unit 237 for receiving control signals from a controlling computer system or a user and for controlling the apparatus by means of control lines 238, for example a system bus connected to the drive means 226, the positioning means 236, the address detector 235, the tracking means 232 and the read means 234.

What is claimed is:

1. A circuit arrangement including means for determining a slicer level from incoming slicer levels and a slicer for slicing the incoming, signal levels on the basis of the slicer level thus determined, characterized in that the means for determining a slicer level include a first and a second register circuit, which registered circuits are connected to an output of a discriminator circuit, which discriminator circuit compares an incoming signal level with a set discrimination level and is adapted to apply an incoming signal level to the first register circuit if the incoming signal level is higher than the set discrimination level and it to apply an incoming signal level to the second register circuit if the incoming signal level is lower than set discrimination level, which first and second register circuit are each adapted to determine a register mean value of the least two different incoming signal levels consecutively applied to the register circuit, and there is a mean-value circuit for supplying a signal having a level which is a mean value of the register mean values determined by the first and seconds register circuit, which supplied signal represents both the set discrimination level and the slicer level, wherein the mean-value circuit has a feed-back that forms an input to the discriminator circuit.

2. A circuit arrangement as claimed in claim 1, characterized in that the first and the second comprise a shift register having a plurality of register positions for consecutively storing incoming signal levels applied by the discriminator circuit, and there is a register mean-value circuit for determining the arithmetic mean of the incoming signal levels stored in the register positions.

3. A circuit arrangement as claimed in claim 1, characterized in that oath of the register circuits performs an operation upon the applied incoming signal levels, which operation as defined in that a new register mean value is determined by multiplying (36) the current register mean value by a factor $(1-a)$, where $0<a<1$, and adding thereto a new incoming signal level to be added, which last-mentioned incoming signal level has been multiplied by a factor $a$.

4. A circuit arrangement as claimed in claim 1, characterized in that the register mean value is defined by at least three different incoming signal levels applied consecutively to the register circuit, and the register mean value is the median of the incoming signal levels applied.

5. A circuit arrangement as claimed in claim 1, characterized in that there is a timing circuit for at least one of the register circuits, the timing circuit has an output connected to a control input of the discriminator circuit, the timing circuit is adapted to be started each time that the discriminator circuit opened supplies an incoming signal level to the representative register circuits, and to supply upon expiry of a determined time interval a control signal to the output connected to the control input of the discriminator circuit, for controlling the discriminator circuit so as to transfer a next signal level to the respective register circuit without discrimination.

6. An apparatus for reading an optical information carrier, which apparatus includes:
   a read head for detecting an optical pattern on the information carrier and in response of thereto supplying a read signal,
   a circuit arrangement as claimed in any one of claims 1 through 5, for receiving the read signal as the incoming signal, and
   to a channel decode and/or an error corrector for processing an output signal supplied by the slicer,
   means for producing a relative movement of the read head with respect to the information carrier.

7. A circuit arrangement as claimed in claim 1, wherein the feedback the discriminator circuit effects the discriminator circuit output.

8. A circuit arrangement as claimed in claim 7, wherein the feedback assists the mean-value circuit in outputting the mean valve of values output by the first register circuit and the second register circuit.

* * * * *